No. 885,626. PATENTED APR. 21, 1908.
L. B. LODMELL.
HEN'S NEST.
APPLICATION FILED JULY 18, 1907.

WITNESSES
Ben. Joffe
Wm. P. Patton

INVENTOR
Lewis B. Lodmell
BY Munn & Co
ATTORNEYS

UNITED STATES PATENT OFFICE.

LEWIS B. LODMELL, OF FLAXTON, NORTH DAKOTA.

HEN'S NEST.

No. 885,626.  Specification of Letters Patent.  Patented April 21, 1908.

Application filed July 18, 1907. Serial No. 384,351.

*To all whom it may concern:*

Be it known that I, LEWIS B. LODMELL, a subject of the King of Norway, and a resident of Flaxton, in the county of Ward and State of North Dakota, have invented a new and Improved Hen's Nest, of which the following is a full, clear, and exact description.

The purpose of this invention is to provide novel details of construction for a hen's nest, which will prevent the breakage of eggs deposited therein by the hen; which always contains a decoy egg, that will yield to the weight of a newly laid egg and permit it to descend into a safe receptacle, and that will preserve a number of eggs unbroken until removed from the nest.

The invention consists in the construction and combination of parts, as is hereinafter described, and defined in the appended claims.

Reference is to be had to the accompanying drawings forming a part of this specification, in which similar characters of reference indicate corresponding parts in all the views.

Figure 1:
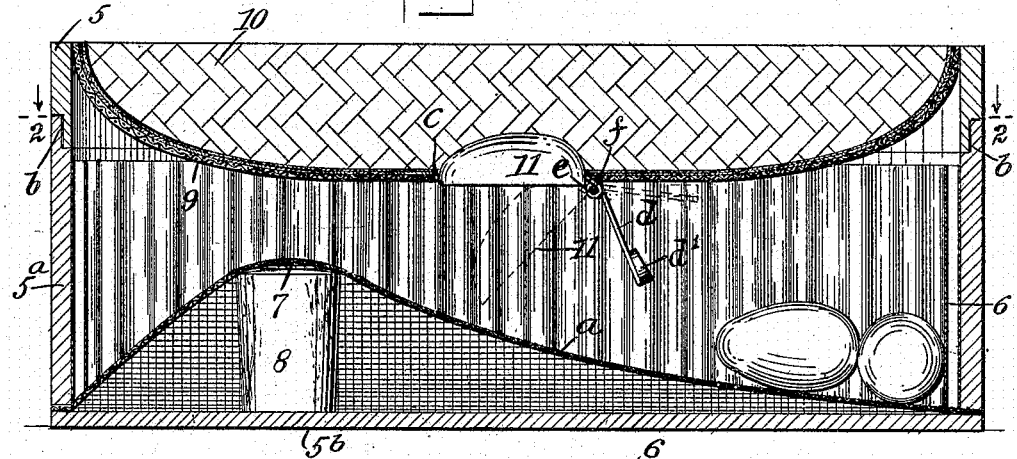
Figure 2:
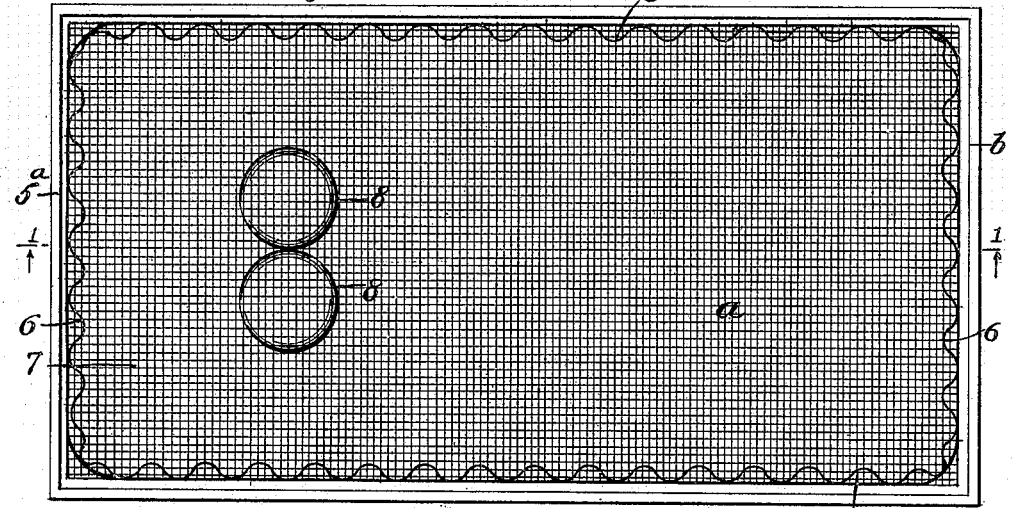
Figure 3:
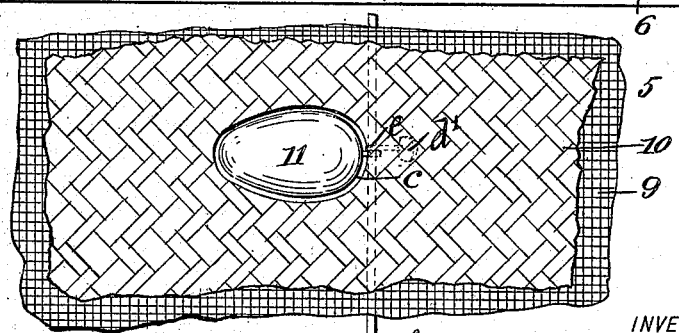

Figure 1 is a sectional side view of a nest embodying the details of the invention, the section being taken substantially on the line 1—1 in Fig. 2; Fig. 2 is a plan view of the lower section of the nest, the upper section thereof being removed on the line 2—2 in Fig. 1; and Fig. 3 is a fragmentary plan view of the nest proper and of the lower section of the device.

The nest, briefly described, comprises an upper section 5 constituting the nest, and a lower section that receives the eggs deposited by a hen in the nest. The lower section is in the form of a preferably rectangular box $5^a$, of suitable dimensions for its use as a receptacle for a quantity of eggs, and may be constructed of wood or other available material. The side walls of the lower section $5^a$ are lined with a pliable material, such, for example, as corrugated pasteboard, as shown at 6 in the drawings. A false bottom 7 is placed in the lower section $5^a$ and is marginally secured therein, this bottom being preferably formed of woven wire cloth.

Posts 8, preferably of cork, are inserted between the solid bottom $5^b$ and the reticulated bottom 7, near an end wall of the lower section $5^a$, said posts causing the woven wire bottom 7 to be elevated where the posts engage therewith and produce an inclined portion $a$, that descends toward the opposite end of the lower section, as is clearly shown in Fig. 1.

The upper or nest section 5 is equal in width and length with these dimensions of the lower section $5^a$, and is removably secured thereon by an engagement of adjacent rabbeted edges $b$, on the upper and lower sections, as represented in Fig. 1. A preferably reticulated bottom 9 is fitted within the upper section 5 of the device, and is marginally secured thereto, said wire woven bottom being dished to give it proper concavity on the upper face thereof.

A soft covering 10 is placed over the reticulated bottom 9 and may be plaited straw or matting, in a suitable number of layers, thus simulating straw, grass or like material of which a hen makes her nest if free to do so. At a point almost centrally of the concave bottom 9 and covering 10 an oval aperture $c$ is formed, of such size as to loosely receive a decoy or imitation egg 11.

The imitation egg 11 is made of a suitable light and durable material and may have a flat lower side. One end of the imitation egg 11 is connected with one end of a lever $d$, pivoted at $e$ on a transverse fulcrum-rod $f$, which receives support from the lower section $5^a$ of the nest. Upon the opposite end of the lever $d$ a weight $d'$ is mounted, that compensates for the weight of the imitation egg 11, and normally supports the latter level, exposing the ovate top portion thereof above the bottom of the nest.

The imitation egg 11, by its support, is disposed in the oval opening $c$, and has clearance from the defining edge of the latter, so that slight weight such as that of an egg, will depress the imitation egg below the bottom of the nest section 5, and open the aperture therein for free passage downward of the egg that has impinged upon the decoy egg 11.

It will be obvious that when an egg is laid by a hen occupying the nest section 5, the dished form of the bottom wall of said nest section, will adapt the egg just laid, to pass down through the aperture $c$ and roll over the ovate surface of the imitation egg 11, that by the weight of the real egg is depressed and inclined, as represented by dotted lines in Fig. 1. The new laid egg by its gravity, is caused to roll down the inclined surface $a$ of the false bottom 7, as will eggs successively laid in the nest section 5.

It will be seen that the eggs which are received in the lower section or compartment 5ª of the nest, are safe from fracture of their shells, cannot be reached by a hen or rat for their destruction, and one or more eggs may at any time be readily removed from the nest section 5ª simply by lifting the upper section 5 of the nest away from the lower one.

One great advantage conferred by the construction of the improved nest in complete form and of the material employed for its manufacture, is the ease with which a nest having the improvements may be renovated; as the corrugated lining wall 6 may be removed by lifting it upwardly, the lower section may then be thoroughly washed and fumigated for destruction of lice, and the upper section of the nest is treated in a like manner, thus enabling the nest to be readily kept in a sanitary condition essential for the health of laying hens.

Having thus described my invention, I claim as new and desire to secure by Letters Patent,—

1. A hen's nest, comprising a lower box-like section open at the top and having a false bottom of reticulated material secured at its edges to the lower portion of the walls of the section, posts between the main bottom of the section and the false bottom thereof and located at one side of the center of length of the section, a removable lining of corrugated card board for said section, said lining resting upon the false bottom and extending to within a short distance of the top of the section, an upper section of the same size as the lower section and having a rabbeted connection therewith, said upper section being provided with a nest proper formed of reticulated material and a covering of soft material, secured at their edges to the upper portion of the said upper section, the reticulated material and covering being concave and extending into the upper portion of the lower section and having a central opening therein, and a pivoted and counterbalanced imitation egg in the said opening.

2. A hens nest, comprising a lower box-like section open at the top and having an inclined false bottom of pliable material, a removable lining of corrugated card board for the said section, said lining having its lower edge shaped to fit and rest upon the false bottom, an upper section open at the top and bottom and fitting snugly on the lower section, a concave bottom of pliable material secured to the upper portion of the said upper section and forming a nest proper, the pliable material extending into the upper portion of the lower section and having a central opening therein, and a pivoted and counterbalanced imitation egg in the said opening.

In testimony whereof I have signed my name to this specification in the presence of two subscribing witnesses.

LEWIS B. LODMELL.

Witnesses:
J. L. JUSTUS,
LORENTS HAAGENSON.